W. L. HAMILTON.
VALVE.
APPLICATION FILED JAN. 22, 1909.
975,524.
Patented Nov. 15, 1910.
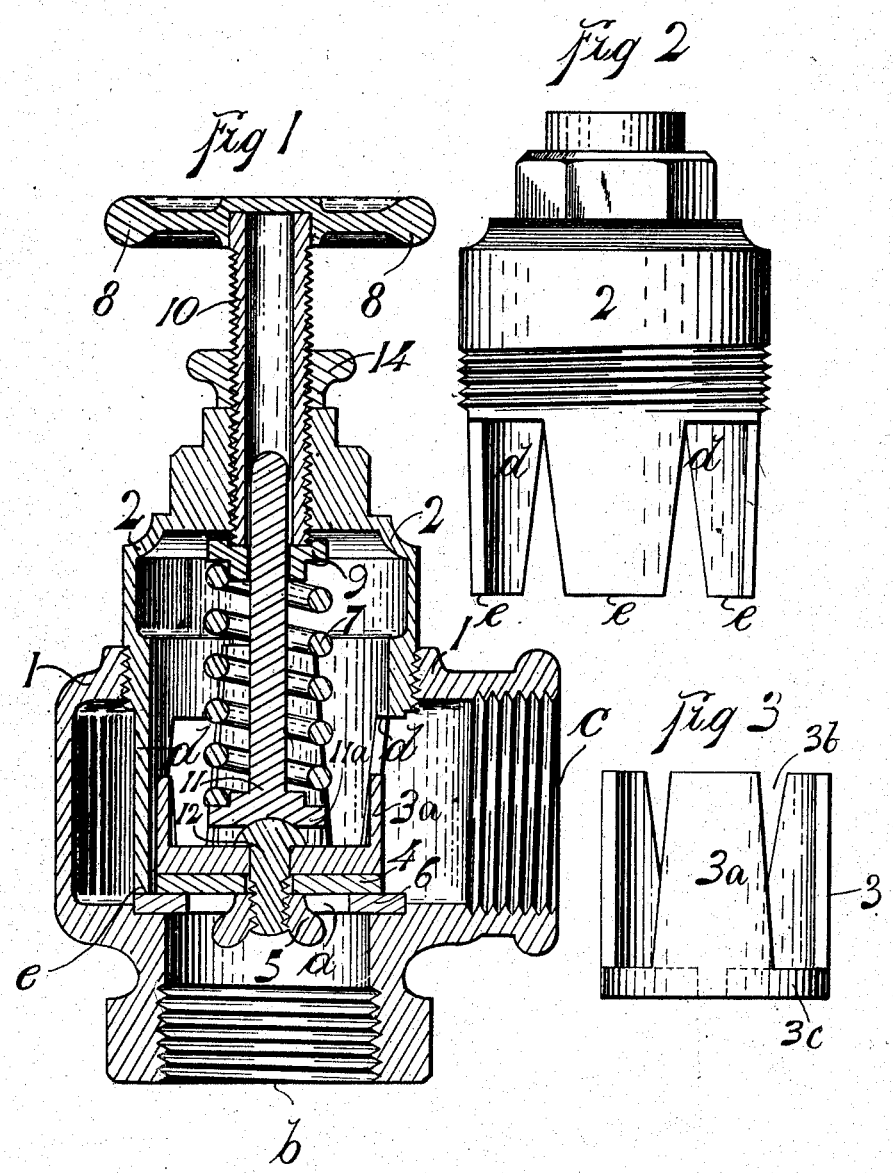

WILLIAM L. HAMILTON, OF BANGOR, MICHIGAN.

VALVE.

975,524. Specification of Letters Patent. Patented Nov. 15, 1910.

Application filed January 22, 1909. Serial No. 473,749.

*To all whom it may concern:*

Be it known that I, WILLIAM L. HAMILTON, citizen of the United States, residing at Bangor, in the county of Van Buren and State of Michigan, have invented certain new and useful Improvements in Valves, of which the following is a specification.

My invention relates to improvements in check-valves of the globe type, and the especial object of the improvements which form the subject matter of this application is to provide a valve of simple and economical construction in which the valve disk and the valve-seat are invertible, readily removable and quickly and cheaply replaceable, thus avoiding the necessity of regrinding valves or seats when the parts become worn or clogged.

A further object is to provide a valve in which the number of parts is reduced to a minimum without impairing the action or effectiveness of the device.

In the accompanying drawing I have shown my improved valve in preferred from in the following views:—

Figure 1 is a vertical sectional view of a valve constructed according to my invention; Fig. 2 is an elevation of the valve-bonnet; Fig. 3 is an elevation of the valve proper.

Referring to the details of the drawing, 1 represents a cylindrical valve casing having internally threaded inlet and outlet openings $b$ and $c$, and with a similarly threaded opening in its top to receive the bonnet 2. This bonnet is provided with threads to screw into the opening in the top of the casing and has downwardly extending legs $e$, with openings $d$ therebetween. The inner cylindrical surface of the legs $e$ serves as a guideway and bearing for the valve 3 which is formed with an annular base portion $3^c$ from which extend legs $3^a$ having openings $3^b$ therebetween which are adapted to register with the openings $d$ in the bonnet.

The base of the valve is axially perforated to receive a bolt 12, the head of which is seated on the inner face of the valve and the threaded portion of which projects below the valve and is supplied with a wing nut 5. This bolt and nut serve to removably attach to the valve 3 a flat annular disk 4 which may be stamped or cast from steel, iron, brass, copper, phosphor-bronze, fiber or other suitable material.

The inner face of the casing around the inlet $b$ is counterbored to provide a seat for a flat ring 6 which is removably and reversibly held on its seat by having the ends of the legs $e$ of the bonnet bear on the ring when the parts are in their assembled relation. This ring may also be made of any suitable material and as both faces are flat, it may be inserted either side up. The upper part of the bonnet is internally threaded to receive the threaded tubular stem 10 of the hand-wheel 8. Loosely fitting the bore of the stem 10 is a pin 11 the lower end of which terminates in a shouldered disk $11^a$ which is hollowed out on its under side to engage the rounded head of the bolt 12. This disk serves as a bearing for the lower end of the expansion coil spring 7 which surrounds the pin 11 and has its upper end bearing against the under side of the washer 9 which fits loosely the pin 11 and is slightly recessed on its upper side to receive the lower end of the stem 10. A lock-nut 14 is screwed on the stem 10 above the top of the bonnet and serves to lock the valve against accidental movement in a manner well known in the art.

It will be apparent that the rounded bolt-head forms a pivotal bearing for the end of the pin 11, thus insuring the proper seating of the valve-disk on its seat 6, and that the hollow stem serves as a guide to maintain the pin 11 in its true position.

The expansive force exerted by the spring is controlled by screwing up or down the stem 10 whereby the distance between the parts 9 and $11^a$ is increased or diminished. Liquid entering the casing through the inlet $b$ under pressure, will raise the valve against the counter-force of the spring 7, and allow it to flow outwardly through the openings $d$.

While I have shown my invention applied to a particular type of valve it will be apparent that it is applicable to other forms of valves in which it is desirable to provide for unusual wear on the exposed surfaces of valve-disk and seat.

By making the wearing portion of the valve and the valve seat, in the form of flat metal washers which may be stamped from any suitable material at a minimum expense, such parts when unduly worn after being inverted, can be thrown away and new pieces substituted, an especial advantage where the valves are used in connection with the distribution of liquids containing acids and solids the action of which is to corrode and wear the exposed surfaces.

Having thus described my invention, what I claim as new, is:—

1. In a valve mechanism, a valve casing, a bonnet screwed into said casing and having legs with openings co-extensive with said legs, a valve slidably fitted in said bonnet and having legs with openings co-extensive with said legs, and a valve-stem yieldingly and loosely seated on said valve.

2. In a valve mechanism, a valve casing, a bonnet screwed into said casing and having legs and openings extending to the inner end of said bonnet, a valve arranged within said bonnet and having legs adapted to slide on the inner face of the bonnet legs, a reversible face plate removably secured to said valve, a valve stem yieldingly and loosely seated on said valve, and means for regulating the pressure of said stem on said valve.

3. In a valve-mechanism, a valve-casing, a bonnet screwed into said casing and having downwardly extending legs with openings extending to the ends of said legs, a valve having upwardly extending legs slidably fitting within the legs of the bonnet, a valve-stem having a head loosely seated on the valve, a spring holding said head in operative engagement with the valve, and means for adjusting the tension of said spring on said head.

4. In a valve-mechanism, a valve-casing, a bonnet screwed into said casing and having openings in its side extending to the inner end of the bonnet, a valve slidably fitting said bonnet, a removable and invertible valve-face plate, a bolt securing said face plate to the valve, said bolt having a rounded head, a valve-stem loosely seated on said bolt head, a spring adapted to hold said valve-stem on its seat, and means for controlling the tension of said spring on said stem.

5. In a valve-mechanism, a valve-casing, a flat disk valve-seat removably arranged in said casing, a bonnet secured in said casing and having spaced legs the inner ends of which bear against said seat, openings between said legs extending to said seat, a valve slidably arranged in said bonnet, a flat disk removably secured to said valve and forming a face therefor, a valve-stem loosely seated on said valve, a spring engaging said stem, means for adjusting the tension of said spring, said means adapted to form a guide for said stem.

In testimony whereof I affix my signature in the presence of two witnesses.

WILLIAM L. HAMILTON.

Witnesses:
F. BENJAMIN,
M. A. MILORD.